Inventors:
Norman R. Dibelius;
Edward P. Kexel,
by (signature)
Their Attorney.

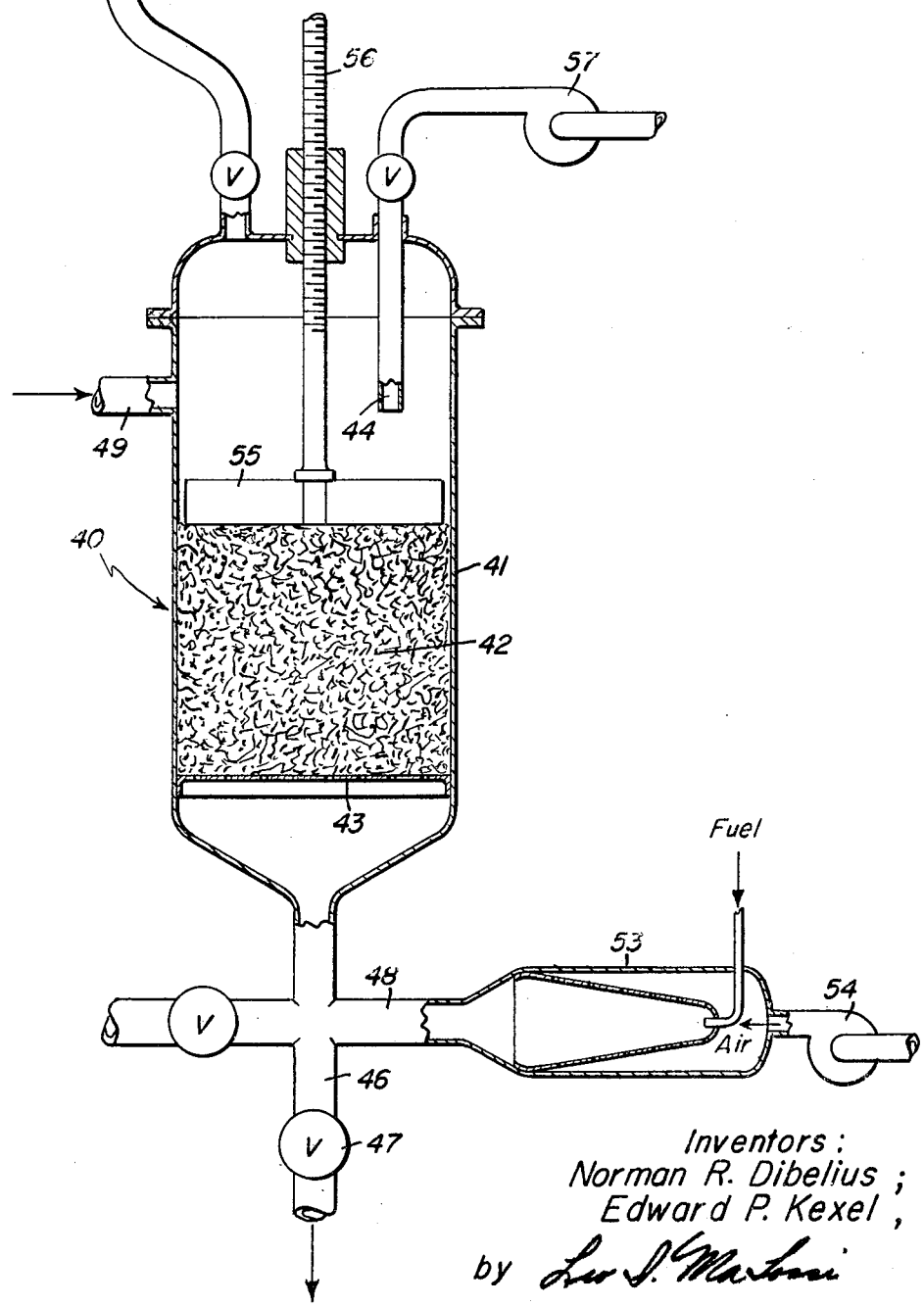

United States Patent Office 3,509,835
Patented May 5, 1970

3,509,835
COMBINED FILTER-INCINERATOR DEVICE
FOR WASTE DISPOSAL SYSTEM
Norman R. Dibelius, Ballston Spa, and Edward Philip Kexel, Altamont, N.Y., assignors to General Electric Company, a corporation of New York
Filed Mar. 4, 1968, Ser. No. 710,074
Int. Cl. F23g 3/06, 5/02
U.S. Cl. 110—8                                    4 Claims

ABSTRACT OF THE DISCLOSURE

A combined filter-incinerator is described in which liquid containing combustible suspended solids is flowed over the top of a bed of non-combustible granular material and the suspended solids are filtered from the liquid as it moves downwardly through the bed of granules. Means act in combination to selectively heat the granular bed and to simultaneously supply a primary combustion air stream, this air stream being caused to move upwardly through the granular bed.

When the granular bed becomes clogged with separated solids and the efficiency of the filter diminishes to some undesirable level the heating and primary combustion air supply means are actuated. After the bed is reduced to the dry state, the combustible solid particles become ignited and burn. The upwardly-directed stream of primary combustion air fluidizes the bed of granules resulting in the release of trapped particles and enabling the carrying away of any fine ash. The abrasive action of the hard granular particles rubbing against each other during fluidization provides a self-cleaning action powdering the ash whereby the ash may be more readily removed by the upwardly directed air stream. Means are provided for introducing secondary combustion air at some point above the top of the granular filter bed. Smoke and odor combine with the secondary combustion air and pass to a heated catalyst bed completing combustion of the unburned gases. Ash is removed from the outgoing gas stream in a dry disposable filter.

In addition to the above-mentioned structural components a particularly advantageous added feature is a rotating skimmer, or scraper, disposed so as to simultaneously scrape over the upper surface of the granular bed and advance a small distance downwardly into the bed as it rotates. As the scraper rotates, it displaces and segregates, but does not separate, filter cake buildup from the upper surface of the granular bed exposing new filtration surface area with each revolution of the scraper, thereby increasing the effective surface area of the filter bed. This added construction is of particular utility in devices for the filtration-incineration of sewage or gelatinous suspensions, because the clogged filter material remains available for fluidizing and incineration during restoration thereby retaining the full depth of the filter bed after restoration.

BACKGROUND OF THE INVENTION

Methods have been disclosed for the treatment of sewage and other impure liquids by (a) filtration through a granular bed to separate the solid material from the liquid and (b) volatilizing the combustible solid impurities collected at the surface of the granular filter bed by burning the impurities from above. Also, means have been employed to agitate the filter bed and the material being treated and as well means have been used for backwashing the filter with clear water in an attempt to remove from within the filter bed those solid particles, which were separated from the liquid, yet which were unaffected by the surface combustion. Apparatus exemplary of this earlier construction is disclosed in U.S. Pat. No. 506,879—Jewell.

The filter construction described in U.S. Pat. No. 593,666—Jewell provides for simultaneously introducing air under pressure together with the upwardly directed wash water to cause agitation of the filter particles and achieve more thorough cleansing action. Still another early filter device provides for extending the useful life between restorations of a bed of filter granules by scraping accumulated deposits from the surface of granular filters, collecting the clogged filtering material and permanently removing it from the filter bed. In one arrangement shown in U.S. Pat. No. 243,233—Farquhar et al. a downwardly advancing box-scraper is employed to scrape and collect the surface deposits and continually expose a clean filtering surface.

The art is in need of improvements for securing more complete removal of solid matter entrapped within the filter bed and for extending the period of time that a granulated bed can be operated as a filter between successive restorations of the entire quantity of filter bed material by incineration. Further, there is considerable need for apparatus and methods of operation particularly adaptable to the automation of the filter-incineration cycle.

SUMMARY OF THE INVENTION

In a first construction of the filter-incinerator of this invention an electric heating coil is embedded in the granular filter bed for its rejuvenation. At intervals (when the liquid flow has been interrupted) the filter bed is heated sufficiently to dry the granules and cause the ignition of any combustible filter cake collected on the surface as well as the combustible solids embedded within the filter bed. At the same time primary combustion air is supplied from some point below the filter bed and is caused to pass upwardly through the bed. This primary combustion air serves both to support the combustion of the separated, dried solids and to fluidize the filter bed. This fluidizing action occurs, because as the temperature of the bed rises the specific volume of the primary combustion air increases producing an increase in its velocity as it passes upwardly and applies a buoyant force to the granules comprising the filter bed.

Means provided above the filter bed introduces secondary combustion air to mix with burned and unburned combustion products and fine ash particles carried upwardly from the filter bed. This mixture continues upwardly to pass through a heated catalyst bed, where oxidation of the unburned odoriferous combustion products is completed. The odor-free products are then vented to the atmosphere through a dry disposable filter to remove the particles of ash.

A second construction of the filter-incinerator of this invention is particularly effective for the filtration of raw sewage or a suspension containing gelatinous material. Such suspensions yield a compressible filter cake, which ordinarily rapidly plugs the filter. One or more scraper blades located at the top of the filter bed are connected to means for rotating and slowly advancing the blade into the bed during filtration pushing a pile of the gradually accumulating clogged filter surface ahead of it. Clean filter surface is, thereby, continually exposed behind the blade maintaining maximum flow through the substantially incompressible filter medium.

In combination with this scraper and filter bed is a source of air hot enough to burn the filtered solids and having sufficient pressure and velocity to fluidize the bed and carry fine ash along with it as the air passes upwardly through the bed. By this means the entire concentration of filter granules is subjected to agitation and restoration by burning. The abrasive action of rubbing of the refractory particles against each other during fluidization helps to powder the ash collected over and between granules from combustion of particles, which have penetrated deeply into the filter bed. This action coupled with the carrying away of the small particles of ash completely out of the filter bed aids in providing more complete restoration of the entire filter including filter granules displaced by the scraper.

Outgoing combustion gases receive secondary air and pass through a heated catalyst bed and then a disposable dry filter to remove the ash.

BRIEF DESCRIPTION OF THE DRAWING

The exact nature of this improvement in filtration-incineration devices as well as other objects and advantages thereof will be readily apparent from consideration of the following specification relating to the annexed drawing in which:

FIG. 2 is a schematic representation of the preferred embodiment of this invention embodying means for extending the period of time that the granular filter can operate between restorations thereof.

DESCRIPTION OF THE PREFERRED EMBODIMENT

Figure 1:
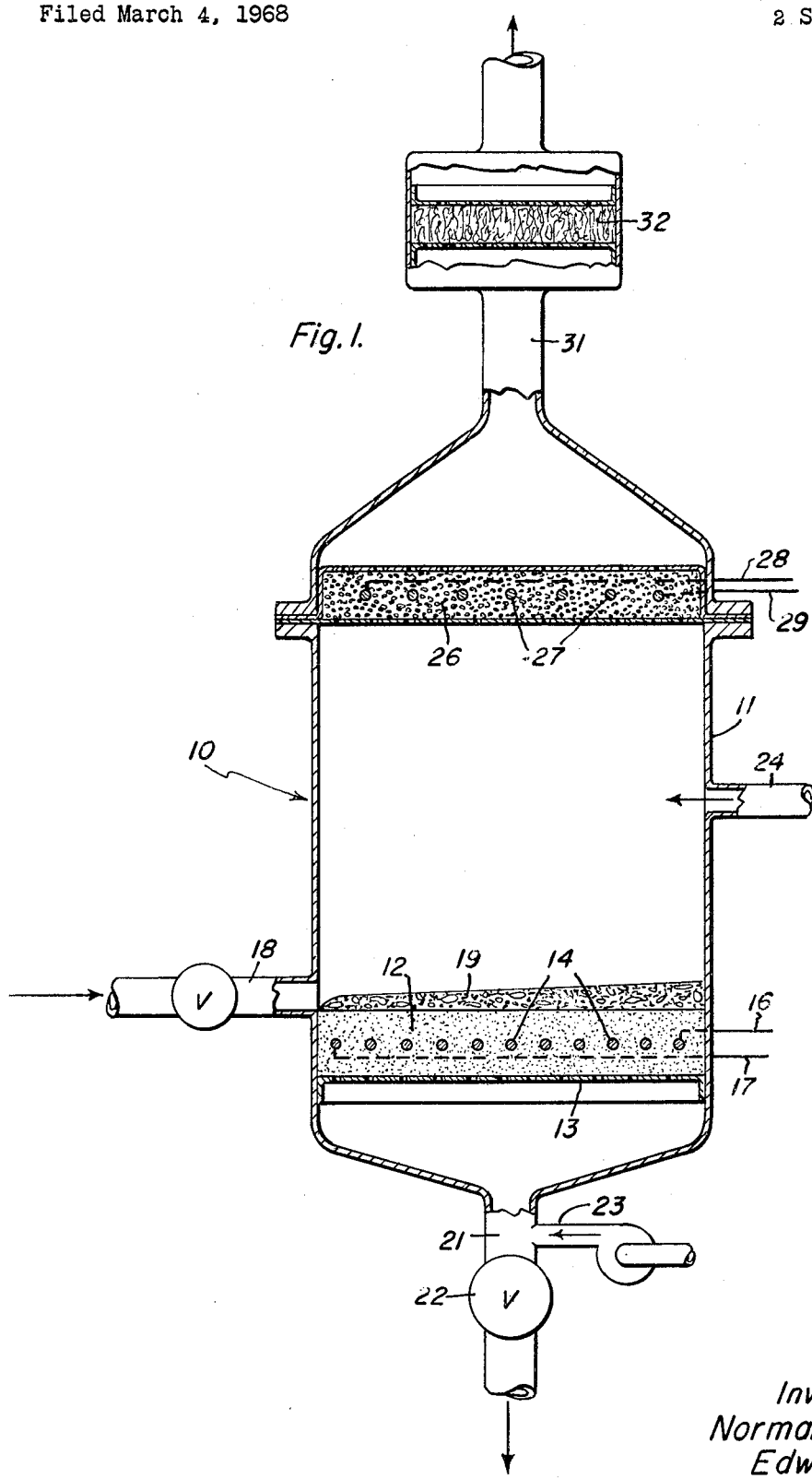
FIG. 1 schematically illustrates an improved filter-incinerator device in which a heating element is embedded in the granular filter bed to supply ignition heat within the filter bed itself as primary combustion air is urged upwardly therethrough.

The filtration-incineration device 10 shown in FIG. 1 comprises a vessel 11 containing a filter bed 12 of incombustible granular material, as for example sand or alumina, having a size ranging from about 14 mesh to about 48 mesh. Foraminous supporting means 13, as for example a properly supported screen, retains the granules of bed 12. Electric grid 14 is embedded in filter bed 12 and is connected for power to an appropriate electric circuit (not shown) by electrical conductors 16 and 17. Inlet 18 is provided for the introduction into vessel 11 of waste water containing suspended combustible solids to be filtered therefrom. Built-up filter cake 19 remains, after the clarified liquid has percolated through the filter 12 and screen 13 and has left the system via pipe 21 and valve 22.

Either after a fixed period of time has passed or when the filter cake 19 has reached some specified thickness, the filtration is interrupted and heater grid 14 is activated to heat bed 12 and its contents to a temperature in the range of between about 1000 and 1500° F. This heating action results in the drying out of bed 12 and the eventual ignition of filter cake 19. In order to support continued combustion of the filter cake and embedded solids primary combustion air is introduced via conduit 23 located below filter bed 12 and passes up through the bed. Upon being heated up in passing up through bed 12 the specific volume of the combustion air increases and produces an increase in the velocity of the combustion air sufficient to fluidize filter bed 12. This fluidizing action loosens and sets free from the refractory granules particles of ash resulting from the combustion of solids embedded within filter bed 12 and carries these fine ash particles upwardly along with the combustion products, which include unburned and noxious gases.

Secondary combustion air is admitted to vessel 11 in the region above filter bed 12 via pipe 24 and this secondary combustion air together with the gaseous products of combustion pass upwardly to and through catalyst bed 26, which is heated by electrical grid 27 to which electricity is provided via lines 28 and 29. Because of the high temperatures involved a large number of catalyst materials may be used, e.g. stainless steel nickel material, however, alumina particles are preferred. The size of the catalyst particles is large enough so that the ash particles carried up from the filter bed may pass right through the catalyst bed 26 with the upward sweep of gases.

The mixture of gases and combustion air produces more complete oxidation of the incompletely burned gases in the presence of the heated catalyst bed and is then carried out of the system by conduit 31. Disposable filter 32 is placed in conduit 31 to remove ash particles from the discharged gases.

After completion of the fluidizing-ignition sequence filter bed 12 is allowed to settle and liquid carrying suspended solids is once again admitted through pipe 18 to continue the sequence.

The filter-incinerator construction 40 shown in FIG. 2 consists of many of the components disclosed in the construction of FIG. 1. Pressure vessel 41 contains a deep bed 42 of an incombustible granular material, as for example sand or alumina of suitable size, preferably in the range of from about 14 to about 48 mesh. Filter bed 42 is supported on foraminous member 43 to allow for drainage of the clarified liquid therefrom.

Input of liquid containing suspended combustible solids is via pipe 44; removal of clarified liquid is via pipe 46 and valve 47; primary combustion air enters through pipe 48 and passes upwardly through filter bed 42, and secondary combustion air enters vessel 41 through pipe 49. Outgoing gases must pass through a heated catalyst bed 50 (of similar material bed 26) and then through a dry disposable filter 51 to remove any ash content.

One convenient source of high temperature, high velocity air is the combustor 53 in which non-stoichiometric ratios of fuel and compressed air from blower 54 are burned at the desired rate. The hot gases leaving combustor 53 should contain at least about 12 percent by volume of uncombined oxygen.

In combination with the aforementioned structural components, construction 40 provides means, which extends the period of time that the filter can operate between fluidizing-incineration cycles. The specific device shown herein is rotating scraper 55 shown at the surafce of filter bed 42. The blades of scraper 55 are affixed to vertical drive screw 56, which in turn is connected to drive means (not shown) automatically controlled to advance scraper 55 a fraction of an inch into filter bed 42 as it sweeps across the upper surface thereof at each revolution. As scraper 55 simultaneously rotates and advances in this manner, it removes the filter cake and a thin layer of the granular filter material at each revolution. This displaced and segregated clogged filter material simply piles up in front of the advancing scraper blades and is carried along thereby. Usually, drive screw 56 rotates during conduct of the filtration just fast enough for a scraper 55 to remove the filter cake plus a small amount of granular material thereby continuously exposing a new surface to the incoming liquid.

If the area of the filter, were for example, one square foot and the filter cake buildup were to reach the plugging condition in about 1 hour and the scraper 55 were to be rotated once an hour to remove the filter cake plus the top layer of sand (about $\frac{1}{16}$ of an inch), then the effective area of the scraper-equipped filter on a 24-hour basis would be equivalent to a filter having a surface area of 24 square feet.

Actually, under usual operating conditions the area-multiplier effect obtained with the rotating scraper 55 may vary from a minimum value of unity in cases in which (a) no blinding or blockage of the filter surface occurs because of the nature of the material being filtered or (b) flow action parallel to the bed surface brings sludge along with it to fill up the space immediately behind scraper 55 so that there is no really effective utilization of the newly generated surface of the filter bed to a maximum value equal to the number of revolutions of the drive shaft 56 in the case in which there is complete removal of the blinded surface along with the immobile sludge thereon.

Various arrangements may be readily applied to the automated operation of the apparatus of this invention. For example, assuming a constant rate of flow of liquid to vessel 41, as bed 42 becomes clogged, liquid will accumulate at the upper surface of the bed to higher than the normal level. Such an accumulation may be sensed by a float switch placed at the desired level on drive screw 56. When actuated this switch would actuate several solenoid relays to (a) shut off pump 57, (b) initiate fuel and compressed air inputs to combustor 53 and (c) initiate ignition of the combustible mixture of fuel and air.

In particulate filter beds of the type described suspended particles separate from the liquids in which they are suspended after penetrating deeply into the filter bed surface where they become trapped in the interstices of the bed or adhered to the surface of the granules. Backwashing of such clogged granular filters with clear liquid can be made to expand the bed so as to partially release the trapped particles freeing some of them to be carried away by the backwash stream. However, backwashing with liquid will not completely restore the filter bed so that in spite of repeated backwashings the efficiency of the filter inevitably and continuously decreases.

Where the trapped material and filter cake are combustible and the granular material is refractory, the filter bed restoration can be accomplished much more effectively by fluidizing the bed with air, which is hot enough to burn the solids and which has sufficient pressure and velocity to carry the fine ash up and away in the outgoing combustion gas stream.

The values of pressure and velocity required with any given filter bed may be determined analytically or by test, because these values depend upon the size and density of the granules forming the bed, the thickness of the bed and the cross-sectional area thereof.

As has been indicated hereinabove, the abrasive action generated between adjacent dry granules as they rub against each other during fluidization with air helps to powder the ash and is significantly instrumental in restoring the granular particles and the filter bed as a whole.

What we claim as new and desire to secure by Letters Patent of the United States is:

1. In a combined filter-incinerator device in which liquid containing suspended combustible solids is flowed through a conduit into a vessel and over the top of a bed of non-combustible granular material contained therein, the suspended solids being filtered from the liquid as the liquid moves downwardly through said bed, the improvement comprising:
   (a) means depending from the vessel construction to the top of the bed for progressively displacing filter cake buildup over the upper surface of said bed and collecting clogged filter granules into at least one pile on said upper surface during active filtration with said bed,
   (b) means connected to the liquid input conduit for controlling the admission to the vessel of liquid to be filtered,
   (c) means in flow communication with the underside of the filter bed for selectively forcing a flow of an oxygenating gas upward through said filter bed, and
   (d) heating means disposed in the path of flow of the oxygenating gas to selectively raise the temperature thereof during flow to above about 1000° F.

whereby, when said filter bed becomes clogged with combustible solids, the input of liquid to be filtered may be interrupted and the filter bed may be simultaneously fluidized and heated to ignite and consume the combustible solids.

2. The improvement substantially as recited in claim 1 wherein the means for displacing and collecting is a rotating scraper and the heating means is a combustor in which air under pressure is burned with fuel in non-stoichiometric ratios to provide large quantities of uncombined oxygen in the hot gas flow to the filter bed.

3. In a combined filter-incinerator device in which liquid containing suspended combustible solids is flowed through a conduit into a vessel and over the top of a bed of non-combustible granular material contained therein, the suspended solids being filtered from the liquid as the liquid moves downwardly through said bed, the improvement comprising in combination:
   (a) means connected to the liquid input conduit for controlling the admission to the vessel of liquid to be filtered,
   (b) means in flow communication with the underside of the filter bed for selectively forcing a flow of an oxygenating gas upward through said filter bed,
   (c) heating means disposed in the path of flow of the oxygenating gas to selectively raise the temperature thereof during flow to above about 1000° F.,
   (d) means for selectively admitting a secondary oxygenating gas to said vessel above said filter bed to mix with the upward moving gas flow leaving said filter bed and
   (e) a concentration of heated catalyst contained in the path of flow of the mixture of secondary oxygenating gas and upward moving gas flow.

4. The improvement substantially as recited in claim 3 wherein the concentration of catalyst is located within the vessel containing the filter bed.

References Cited
UNITED STATES PATENTS

| | | | |
|---|---|---|---|
| 506,879 | 10/1893 | Jewell | 210—152 |
| 2,911,284 | 11/1959 | Hochmuth | 110—7 X |
| 3,306,236 | 2/1967 | Campbell | 110—8 |
| 3,411,465 | 11/1968 | Shirai | 110—8 |

SAMIH N. ZAHARNA, Primary Examiner

U.S. Cl. X.R.
210—68, 152, 274